H. F. WILLSON.
Tongue and Support.
No. 57,806. Patented Sept. 4, 1866.
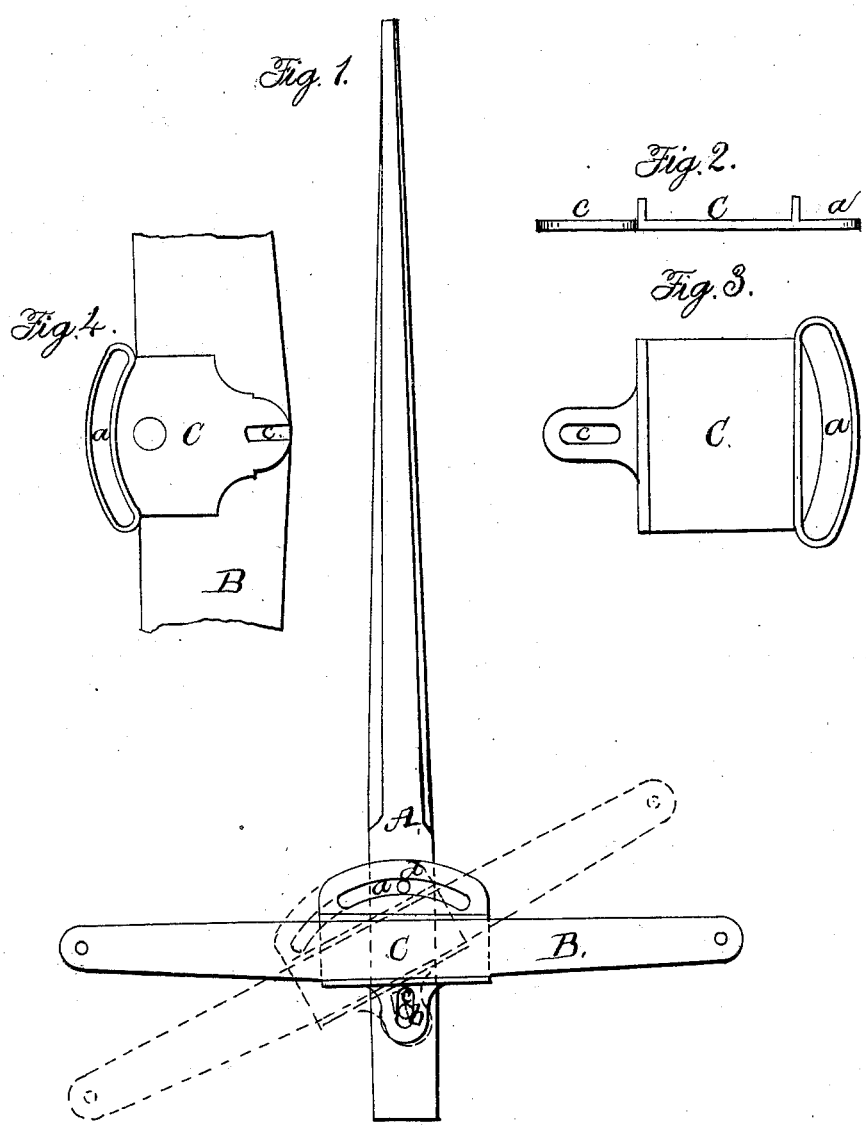

UNITED STATES PATENT OFFICE.

HENRY F. WILLSON, OF ELYRIA, OHIO.

IMPROVEMENT IN EVENERS FOR POLES FOR WAGONS, &c.

Specification forming part of Letters Patent No. 57,806, dated September 4, 1866; antedated August 15, 1866.

*To all whom it may concern:*

Be it known that I, HENRY F. WILLSON, of Elyria, in the county of Lorain and State of Ohio, have invented certain new and useful Improvements in Eveners for Poles for Waggons and other Vehicles; and I do hereby declare that the following is a full, clear, and exact description thereof, reference being had to the accompanying drawings, and to the letters of reference marked thereon.

In the drawings, Figure 1 is a plan; Figs. 2 and 3, detached views of same. Fig. 4 is a detached view, showing a modified form of the same.

Like letters refer to like parts in the different figures.

The nature of my invention consists in constructing an apparatus whereby the fulcrum of the evener of wagon-poles or other vehicles will, by its own movements, so shift or change itself as to establish an equilibrity of power at each end of the evener at all times, even when from any cause one horse pulls more than the other, and thus preventing either horse from gaining even a temporary advantage over the other while pulling, as is always the case in using the ordinary evener when one horse, from any cause, gets in the advance and the other gets in the rear.

To enable others skilled in the art to make and use my invention, I will now proceed to describe its construction and operation.

A represents the ordinary pole of a wagon. B represents the evener, which is secured to a sectoral plate of metal, C. Plate C is provided with a circular slot, *a*, which is described from a point, *b*, in a radial slot, *c*, that is formed in the same plate. (See Fig. 2.) *d* is a bolt, which is passed through slot *a*, and sustains the pressure of the draft. *b* is a bolt which passes through slot *c*, and thus secures that end of the plate in position, but allows it to oscillate freely on that point, and at the same time gives it the necessary clearance, so that the bolt *b* is subjected to no other than a lateral strain. The evener is firmly secured to the plate by means of bolts or otherwise.

The operation of this apparatus is as follows: When the evener stands at right angles to the pole the fulcrum or bolt *d* is in the center of the evener; but the instant either end is advanced so as throw the evener in an oblique position, (see Fig. 1, red lines,) then the rear end becomes elongated, and the advanced end is proportionably shortened. This elongation and shortening of the respective ends of the evener are considerations of much importance, as, first, in giving the horse in the rear an advantage in the leverage exactly in proportion to the advantage gained by the advance of the other horse.

It is well understood in practice that the horse that starts first gains an advantage over the other just in proportion to the amount of advance that he gains, which advantage must be overcome by extra exertions of the horse in the rear before they can be placed on an equality and draw with equal advantage. Thus the strength of the advanced horse is not fully exerted, while the rear hose is over-exerted in order to gain an equilibrium. Hence often, when one horse obtains a bad or an insecure footing, or slips on a hill, he is thrown behind, and by an equal exertion of strength with the other is unable to regain the loss he has sustained, and therefore becomes discouraged, and often balks, while, if he can have a temporary advantage of leverage in proportion to the loss he has sustained, the difficulty will be entirely obviated, and the moment the horses come abreast the leverage will be equalized.

The advantages of this improvement are too obvious to need comment.

What I claim as new, and desire to secure by Letters Patent, is—

The radial slot *c* and stationary pin or bolt *b*, in combination with curved slot *a* and stationary pin *d*, the whole being constructed in the manner and for the purpose set forth and described.

HENRY F. WILLSON.

Attest:
R. B. BULLOCK,
R. I. JONES.